Feb. 19, 1929.  J. F. NEWSOM  1,702,480
HEAT CONTROL FOR COOKING DEVICES
Filed June 15, 1925   2 Sheets-Sheet 1
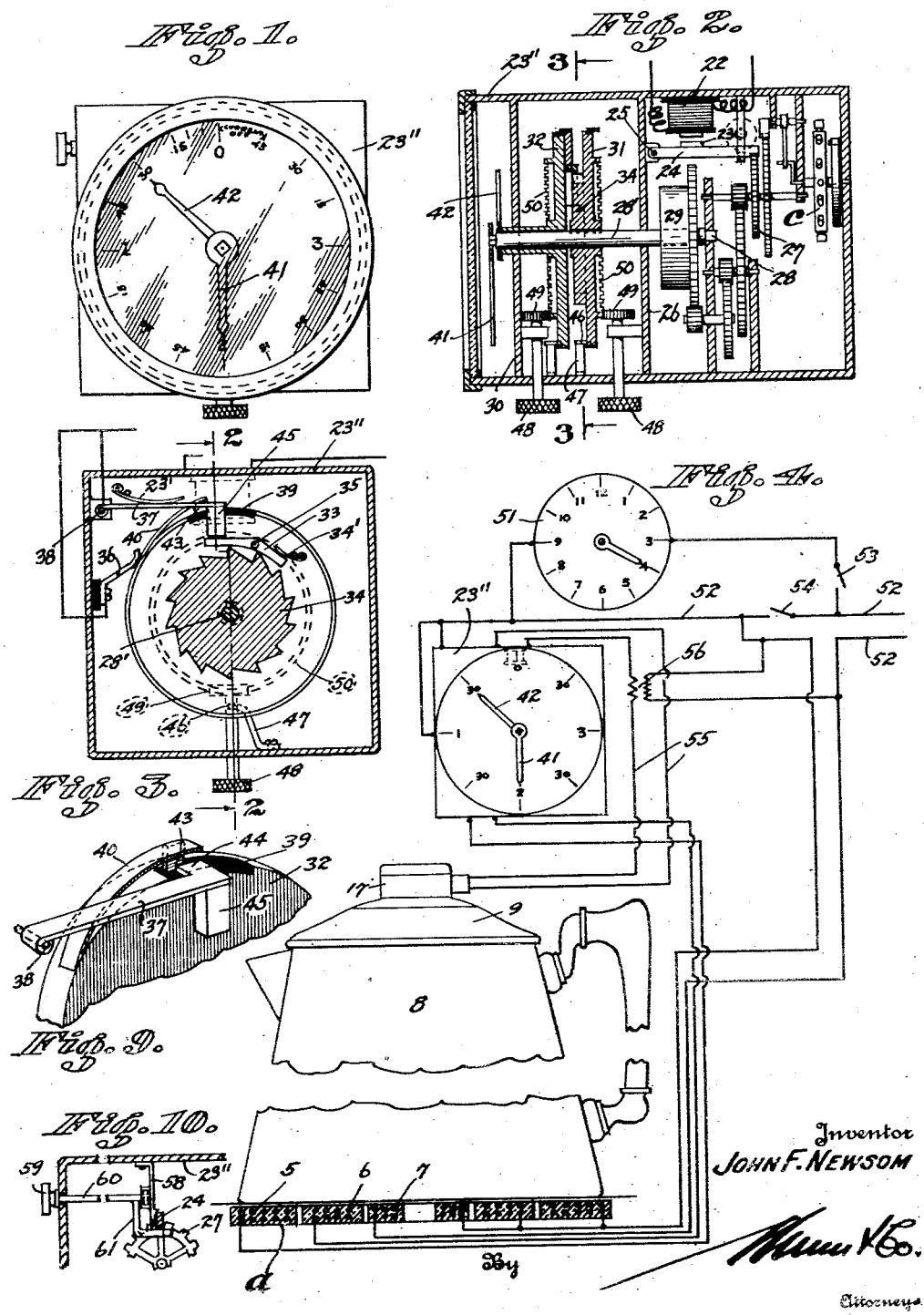

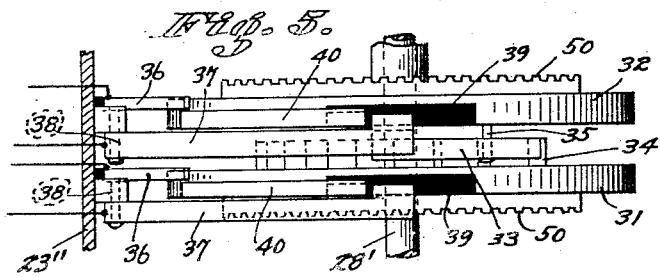
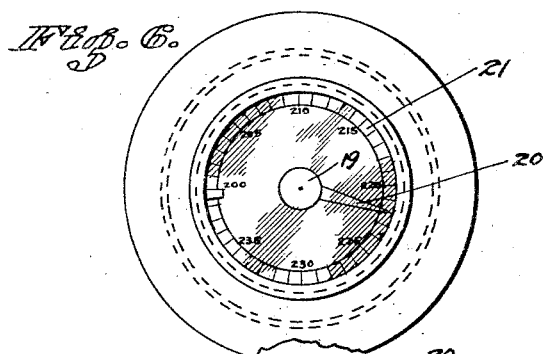
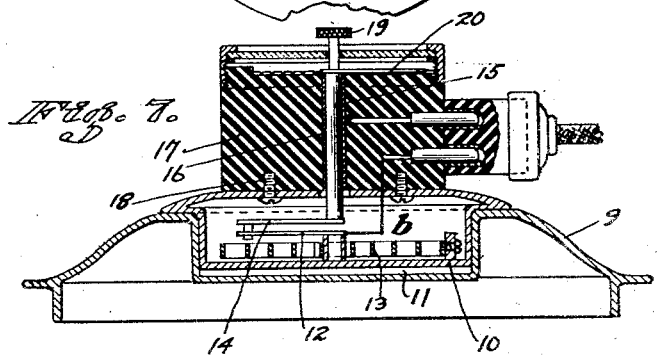
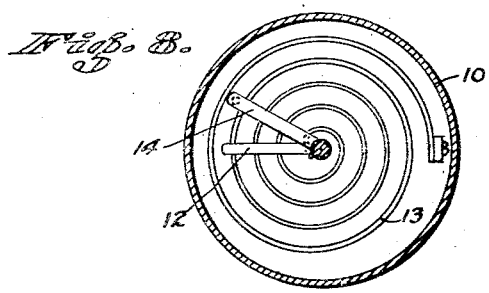
Inventor
JOHN F. NEWSOM

Patented Feb. 19, 1929.

1,702,480

UNITED STATES PATENT OFFICE.

JOHN F. NEWSOM, OF PALO ALTO, CALIFORNIA.

HEAT CONTROL FOR COOKING DEVICES.

Application filed June 15, 1925. Serial No. 37,293.

The present invention relates generally to improvements in cookers for food, and has specific reference to cookers wherein means are employed for controlling the temperature of the heat.

The general object of the invention is the provision of a control operable automatically to modify the heat, as for instance, by reducing the temperature thereof at a predetermined time after the material to be cooked attains a predetermined temperature and further effecting at a subsequent predetermined period of time another modification in temperature as by discontinuing the heat.

The above and other objects are accomplished by instrumentalities pointed out in the following specification.

The invention is clearly defined in the claims.

A satisfactory embodiment of the invention is illustrated in the accompanying drawing forming part of the specification and in which Figure 1 is a detail front elevation of the time controlled apparatus for controlling the heater.

Figure 2 is a vertical longitudinal section of Figure 1.

Figure 3 is a vertical cross-section taken on the line 3—3 of Figure 2.

Figure 4 is a diagrammatic view of an embodiment of the complete invention.

Figure 5 is a detail plan of the time controlled circuit controllers.

Figure 6 is a fragmentary plan view of the temperature controlled device.

Figure 7 is a detail vertical cross-section of Figure 6.

Figure 8 is a detail horizontal cross-section showing the thermostat.

Figure 9 is a fragmentary perspective of one of the circuit controllers, and

Figure 10 is a detail of the armature lock and releasing means.

In Letters Patent of the United States No. 1,437,005, granted to me under date of November 28th, 1922, I show a cooker operating on the principle of maintaining a continued heat for a selected predetermined period of time after the material attains a predetermined temperature and then operating automatically to discontinue the heat.

The present invention contemplates, in addition to the use of the patented step, the employment of a second selected predetermined temperature for a selected predetermined period of time. As compared with the above described first step, the distinguishing characteristics of the second reside in the degree of heat employed and the time period of its use; and additionally in the provision of a control for bringing about the operation of the first step automatically at a selected predetermined time. But the use of this adjunct is optional.

In the drawings, $a$ indicates a heater which may be of any well known type wherein the flow of the heating medium may be varied to regulate the temperature required for cooking. For purposes of illustration, I have shown $a$ as an electric heater made up of the units 5, 6 and 7. Of these maximum heat is had by the employment of 5 and 6 in combination, the employment of either 5 or 6 produces intermediate heat, and 7 serves merely as a warmer to prevent total cooling of cooked material. 8 indicates a cooking utensil such as a pot for containing the material to be cooked. The closure 9 is herein shown as being removable and is constructed with a view of providing a lid or closure for any of conventional types of cooking vessels. Disposed in thermal contact with the closure 9 is a thermostatic circuit closer $b$ of any approved type as for instance a coil type as shown in Figures 7 and 8. The casing 10 of circuit closer $b$ is preferably disposed within a central pocket 11 of cover 9. The turnable metallic arm 12 operated by the heat responsive coil 13 is disposed so as to turn into contact with a metallic arm 14 adjustably supported within casing 10 by being connected to a manually adjustable shaft 15 extending through and frictionally held by a sleeve 16 which extends through a superimposed insulator 17 secured as by screws 18 to casing 10. A knob 19 of insulating material is rigidly connected to shaft 15 and a pointer 20 carried by the knob extends over the divisions of a thermal scale 21 formed upon the upper end of insulator 17. This arrangement of parts lends itself readily to effect direct contact between the arms 12 and 14 when any predetermined temperature indicated by pointer 20 has been attained on the part of coil 13, or the material being cooked within receptacle 8. It being obvious that any adjustment of arm 14 corresponds with the position which arm 12 will occupy when the temperature of the coil corresponds with the temperature indicated upon the scale 21 by the pointer. Contact on the part of arms 12 and 14 closes a circuit through an electro-magnet 22 disposed in a clock casing 23'' supported in any convenient location with respect to the structure of which the burner $a$ forms part. The armature 23 of the electro-magnet carries a latch 24 pivoted at 25 to a support 26 within the casing. The free end portion of the latch when the magnet is deenergized engages between the teeth of gear wheel 27 carried by one of the shafts of a conventional clockwork $c$ and thereby latches the clockwork. The main spring winding post 28 of clockwork $c$ which, for purposes of illustration, I have shown as turnable by the unwinding movement of main spring 29 has one end extended outwardly as a shaft 28' and directed through the support 26 and dial 30. In the construction shown this shaft completes one rotation in approximately four hours. A pair of circular commutators 31 and 32 are respectively keyed to and loose upon shaft 28'. The commutators are detachably locked together by the engagement of a pawl 33 with a ratchet wheel 34. These devices being disposed on the opposed faces of the commutators with the ratchet fixedly secured to one of the parts preferably the disk 31, and the pawl which is spring pressed at 34' is pivoted as indicated by 35 to the disk 32. When the pawl and ratchet are engaged the commutators together with the shaft 28' turn continuously as a unit and close an electric circuit between stationary contact brushes 36 and movable contact brushes 37 pivoted at 38 to casing 23 and spring pressed as indicated by 23'. The free ends of the brushes bear upon opposite marginal portions of the peripheries of the commutators. Those marginal portions upon which the pivoted brushes 37 bear are interrupted by insulated areas 39 and resilient metallic risers 40, as shown in Figures 2, 3, 5 and 9. The insulated areas 39 are disposed so that they will be at the uppermost parts of the commutators and in contact with the free end portions of movable brushes 37 when the indicator hands 41 and 42 which are respectively rigidly connected to the commutators, point to zero on the dial 30. The risers 40 extend from the medial portions of the insulated areas at which points they are held elevated by inwardly bent extensions 43 directed into the insulated areas 39, and extend over the inwardly directed contacting free end portions 44 of the brushes 37. From their elevated ends the risers slope in the direction of the circumference of the commutators and their free end portions make contact with the peripheries of the commutators at points spaced from but in angular alinement with one end of the insulated areas 39. An insulated block or head 45 depends from one of the brushes 37 and extends into the intervening space between the adjacent faces of the commutators and into contact with one end of the pawl 33 which is prevented from engaging with the ratchet by the presence of the block as shown in Figure 3. In this position of the parts commutator 32 which is loose upon shaft 28' is held stationary, but commutator 31 rotates with the shaft 28' until a pin 46 carried thereby abuts against a resilient stop 47 which has sufficient rigidity to overcome the force exerted by main spring 29. A similar pin and stop construction is provided in connection with commutator 32 to prevent accidental turning movement thereof.

The pin and stops 46 and 47 by reason of the bent free end portions of the stops permit of overriding on the part of the pins when the commutators are rotated in one direction for the purpose of winding the main spring by turning either of the knobs 48 which are connected by suitable gear wheels, as indicated by 49 and 50 to the commutators. In the turning of the knobs 48 for setting the hands 41 and 42 or winding the main spring, the free ends of the risers 40 will lift and pass over the extensions 44 of the brushes 37 when the commutators are turned in a clockwise direction as viewed in Figure 3 or in a contra-clockwise direction as viewed in Figure 1. In this turning of the commutators pawl 33 moves away from head 45 and then engages the ratchet 34 moving under the action of its spring 34'. When the commutators turn under the action of main spring 29 from any previously adjusted position, the free end portions of risers 40 upon being brought into contact with the lateral extensions 44 of the brushes 37 will underride the said extensions so that the free end portions of the brushes will override the risers and be elevated thereby until they are released by the elevated ends of the risers moving beyond extensions 44. In the downward movement of the brush 37 that carries head 45, pawl 33 is disengaged from the ratchet 34 by a blow delivered thereto by head 45.

In the operation of the device thus far described, the operator by means of the insulated knob 19 turns pointer 20 to one of the divisions of scale 21 corresponding to the heat degree or temperature at which it is desired to set the time controlled apparatus in operation. The indicator hand 42 is then adjusted to a division on dial 30 corresponding to the predetermined period of time at which it is desired to cook at high heat, after which indicator hand 41 is turned to another division of dial 30 corresponding to the period of time desired for cooking the material at low or reduced heat. When the material being cooked in receptacle 8 attains the predetermined temperature as indicated by pointer 20 the arms 12 and 14 make contact and close the circuit of the electro-magnet 22 which operates latch 24 to unlatch the clockwork mechanism $c$. Shaft 28' now turns the commutators in a clockwise direction, as viewed in Figure 1. In that figure, it will be noted indicator hand which is connected to commutator 32 points to 30 minutes and the other hand 41 to two hours, thus indicating that the period of time required for the entire cooking operation amounts to two hours. In adjusting hands 41 and 42, it will be observed that the insulated areas 39 turn away from brushes 37 leaving these in contact with the metallic peripheries of the commutators so that the circuits are closed through the units 5 and 6 of heater *a*. The maximum heat now had continues until riser 40 of commutator 32 trips brush 37 carrying head 45 which upon striking pawl 33 operates to unlock commutator 32, and at the same time the circuit of one of the units preferably unit 5 is opened by the brush descending into contact with the insulated area of commutator 32. By cutting out unit 5, it is evident that a reduction in the heat volume will be had which brings about a reduction in the temperature of the material being cooked and this reduced temperature continues until riser 40 of commutator 31 trips the other of the brushes 40 into descending upon the insulated area of commutator 31, at which time the circuit of unit 6 is opened and the heat cut off.

When latch 24 is lifted by magnet 22 a resilient keeper 58 engages the latch and prevents it from reengaging the clockwork during the period of cooking with low heat. This keeper is released after the final cooking period by pulling a knob 59 rotatably connected to the keeper by a spindle 60. An angular shaped arm 61 on the spindle 60 serves to disengage the latch 24 from the clockwork when the knob is turned, so that the time period for cooking with high or low heat is controllable by the user even after the device is set in operation.

In Figure 4 I have shown a time controlled circuit closer 51 of ordinary type connected in a main circuit 52 in which there are two switches 53 and 54. When switch 54 is closed the circuit is closed through the warmer or unit 7, and the other units will operate as previously described after adjustment of the time and temperature controlled devices. When switch 53 is closed and switch 54 opened and the time and temperature controlled devices adjusted as desired, the device will not go into operation until a selected predetermined time as indicated by the time controlled circuit closer 51 is had. The electromagnetic circuit indicated by 55 has included therein a bell transformer 56 and the terminals provided by the arms 12 and 14. Although I have shown and described the present embodiment in connection with an electric device adapted for cooking food and operating to heat the material first with a high degree and then with a low degree of heat, it is obvious that the device is usable in other instances wherein it is required to treat material with different predetermined temperatures for corresponding or different predetermined periods of time. In this connection it will be further observed that by the employment of a different number of insulated areas or a different arrangement or proportioning of these from that shown in either one of the commutators, heating effects opposite to those previously described may be had, and also a greater number of heating units may be employed.

I claim:

1. In an electric cooker, a heater, means for cutting off the flow of current to the heater after a predetermined period of time, and including a clockwork mechanism, electromechanical means for setting the clockwork in operation, a receptacle for the material to be cooked and a closure for the receptacle having a thermally responsive device electrically connected to the said electro-mechanical means for operating the same to release the clockwork after the material in the receptacle attains a predetermined temperature.

2. A cooker comprising adjustable electromechanical means for maintaining a heat at a constant temperature for a predetermined period of time, and adjustable electro-mechanical means for changing the heat at the end of this period of time and for maintaining the changed temperature for another predetermined period of time.

3. A food-retaining receptacle for cooking food contained therewithin, means for applying different degrees of heat to the receptacle, and manually-regulated means for maintaining a certain temperature for a pre-determined period of time and then automatically changing to a second temperature and holding this for another pre-determined period of time.

4. A food-retaining receptacle for cooking food contained therewithin, means for applying different degrees of heat to the receptacle, manually-regulated means for maintaining a certain temperature for a pre-determined period of time and then automatically changing to a second temperature and holding this for another pre-determined period of time, and thermostatic means controlled by the temperature within the receptacle for starting the functioning of said manually-regulated means.

5. A receptacle for food, a thermostat carried thereby, a clock in electrical connection with said thermostat, means for starting said clock when the thermostat reaches a pre-determined temperature, a plurality of heating units for said receptacle and being in electrical connection with said clock, manually-adjusted switches carried by said clock and being closed at pre-determined time intervals, said switches connecting different groups of heating units together for effecting pre-determined changes of temperature within said receptacle.

6. A receptacle for food and a thermostat carried thereby, a plurality of heating coils for said receptacle, a plurality of switches for said coils, a clock for closing said switches at pre-determined time intervals, and manually-regulated means for causing the clock to close said switches for a certain period of time and other switches for a second period of time, said thermostat being electrically connected to said clock for starting the functioning of the latter when the former reaches a pre-determined temperature.

JOHN F. NEWSOM.